US008060924B2

(12) United States Patent
Usov (10) Patent No.: US 8,060,924 B2
(45) Date of Patent: Nov. 15, 2011

(54) ON-LINE CENTRALIZED AND LOCAL AUTHORIZATION OF EXECUTABLE FILES

(75) Inventor: Viacheslav Usov, Strassen (LU)

(73) Assignee: Lumension Security, Inc., Scottsdale, AZ (US)

( * ) Notice: Subject to any disclaimer, the term of this patent is extended or adjusted under 35 U.S.C. 154(b) by 1031 days.

(21) Appl. No.: 11/107,900

(22) Filed: Apr. 18, 2005

(65) Prior Publication Data

US 2005/0262558 A1    Nov. 24, 2005

Related U.S. Application Data (60) Provisional application No. 60/562,983, filed on Apr. 19, 2004, provisional application No. 60/562,982, filed on Apr. 19, 2004, provisional application No. 60/564,579, filed on Apr. 23, 2004.

(51) Int. Cl.
| | |
|---|---|
| G06F 7/04 | (2006.01) |
| G06F 11/30 | (2006.01) |
| G06F 21/00 | (2006.01) |
| G06F 15/173 | (2006.01) |
| H04L 29/06 | (2006.01) |
| H04L 9/32 | (2006.01) |
| G06F 1/00 | (2006.01) |
| G06F 11/00 | (2006.01) |
| G06F 9/455 | (2006.01) |

(52) U.S. Cl. ............ 726/10; 726/4; 713/151; 713/156; 713/158; 713/175; 713/182; 713/187; 713/188; 709/229

(58) Field of Classification Search .............. 726/10, 726/4; 713/188, 156, 158, 175, 151, 182, 713/187; 709/229
See application file for complete search history.

(56) References Cited

U.S. PATENT DOCUMENTS

| | | | |
|---|---|---|---|
| 5,794,049 A | 8/1998 | Lindholm | 717/136 |
| 5,826,088 A | 10/1998 | Sitbon et al. | 717/139 |
| 5,854,930 A | 12/1998 | McLain et al. | 717/139 |
| 5,923,878 A | 7/1999 | Marsland | 717/139 |

(Continued)

FOREIGN PATENT DOCUMENTS

GB     2404262 A  *  1/2005

(Continued)

OTHER PUBLICATIONS

Reiner Kraft, "Designing a distributed access control processor for network services on the Web", Nov. 2002, XMLSEC '02: Proceedings of the 2002 ACM workshop on XML security, Publisher: ACM, pp. 36-52.*

(Continued)

*Primary Examiner* — Michael Pyzocha
*Assistant Examiner* — Courtney D Fields
(74) *Attorney, Agent, or Firm* — Greeberg Traurig, LLP (57) ABSTRACT

A system and method for controlling the execution of executable files. The executables are identified by either a cryptographic digest or a digital certificate. The crytographic digest is computed from the binary image of the executable. An executable that is attempting to execute is intercepted by a protection module that consults a database of stored rules over a secure channel to determine whether or not the executable can be identified as a permitted executable and whether or not it has permission to execute on a particular computer system under certain specified conditions. If a stored permission is available, it is used to control the execution. Otherwise, the user is consulted for permission.

7 Claims, 4 Drawing Sheets

U.S. PATENT DOCUMENTS

| | | | | |
|---|---|---|---|---|
| 6,038,394 | A | 3/2000 | Layes et al. | 717/139 |
| 6,094,528 | A | 7/2000 | Jordan | 717/115 |
| 6,141,793 | A | 10/2000 | Bryant et al. | 717/115 |
| 6,367,012 | B1 * | 4/2002 | Atkinson et al. | 713/176 |
| 6,473,893 | B1 | 10/2002 | Kay et al. | 717/116 |
| 6,721,941 | B1 | 4/2004 | Morshed et al. | 717/127 |
| 6,766,454 | B1 | 7/2004 | Riggins | 713/185 |
| 6,941,470 | B1 * | 9/2005 | Jooste | 726/4 |
| 6,996,814 | B2 | 2/2006 | Bak | 717/148 |
| 7,454,508 | B2 * | 11/2008 | Mathew et al. | 709/229 |
| 7,500,108 | B2 * | 3/2009 | Johnson et al. | 713/187 |
| 2001/0051930 | A1 | 12/2001 | Nakamura | 705/56 |
| 2002/0091186 | A1 | 7/2002 | Auerbach | 524/261 |
| 2002/0099952 | A1 | 7/2002 | Lambert et al. | |
| 2003/0070083 | A1 | 4/2003 | Nessler | 713/193 |
| 2003/0204842 | A1 | 10/2003 | Chenelle et al. | 717/177 |
| 2005/0223239 | A1 * | 10/2005 | Dotan | 713/188 |

FOREIGN PATENT DOCUMENTS

| | | |
|---|---|---|
| WO | WO98/50843 | 11/1998 |
| WO | WO 98/50843 A | 11/1998 |
| WO | WO01/98876 | 12/2001 |
| WO | WO 01/98876 A | 12/2001 |
| WO | WO2005/099342 | 10/2005 |

OTHER PUBLICATIONS

Hawkins, W., *LIMP: An Interpreted Programming Language for Students, Professors and Programmers*, Consortium for Computing Sciences in Colleges: Southeastern Conference, JCSC, vol. 19, No. 3, pp. 96-109 (Jan. 2004).

Karinthi, et al., *Incremental Re-Execution of Programs*, ACM, pp. 38-44 (1987).

Kc, et al., *Countering Code-Injection Attacks With Instruction-Set Randomization*, ACM, pp. 272-280 (2003).

Milanés, et al., *Managing Jobs With an Interpreted Language for Dynamic Adaptation*, ACM, pp. 1-6 (2005).

International Search Report and Written Opinion in related PCT application PCT/IB05/002335, pp. 1-10 (Feb. 8, 2006).

Written Opinion of the International Searching Authority in related PCT application PCT/IB05/002755, pp. 1-5 (Feb. 23, 2006).

Written Opinion of the International Searching Authority in related PCT application PCT/IB05/001623, pp. 1-6 (Oct. 25, 2006).

* cited by examiner

ON-LINE CENTRALIZED AND LOCAL AUTHORIZATION OF EXECUTABLE FILES

CROSS-REFERENCE TO RELATED APPLICATIONS

This application is related to U.S. Provisional Application, Ser. No. 60/562,983, filed Apr. 19, 2004, and titled "A Generic Framework for Runtime Interception and Execution Control of Interpreted Languages," which application incorporated by reference into the instant application.

This application is related to and claims priority to U.S. Provisional Application Ser. No. 60/562,982, filed Apr. 19, 2004, and titled "ONLINE CENTRALIZED AND LOCAL AUTHORIZATION OF EXECUTABLE FILES," which application is incorporated by reference into the instant application.

This application is related to U.S. Provisional Application Ser. No. 60/564,579, filed Apr. 23, 2004, titled "TRANSPARENT ENCRYPTION AND ACCESS CONTROL FOR MASS STORAGE DEVICES," which application is incorporated by reference into the instant application.

FIELD OF THE INVENTION

The invention extends the security framework of the contemporary computer operating systems. It relies on the operating system to provide system services to load and/or execute standalone executable modules.

DESCRIPTION OF THE RELATED ART

Cryptographic digests, public and symmetric key cryptography, and digital certificates are used extensively in order to identify executables and secure communication links between the server and the protection module. A number of algorithms (SHA-1 for digests and certificates, RSA public key cryptography for certificates and secure communications, AES for secure communications) are known to persons skilled in the art and are employed by the system.

A technique for intercepting system services on the MS Windows NT family of operating systems is used. The technique involves overwriting ("patching") the system service table. The technique is known to persons skilled in the art.

The prior art has employed black-list systems, execution pattern systems, purely white-list systems, white-list systems in combination with black-list systems and execution pattern systems, and systems with cryptographic digests, digital certificates and fixed priority rules. Each of these is discussed in turn.

Black-List Systems

These systems check whether an executable is previously known as harmful. Systems follow the black-list approach when a knowingly harmful executable or an executable that appears to be harmful is blocked or the user is asked for a decision. Such a system typically results in a quick spread of harmful executables that the systems are not aware of. Other systems that follow a black-list approach often fail to detect harmful executables.

Systems that follow a black-list approach also rely on a vendor-supplied update, which leaves an organization essentially unprotected and business process interrupted for a period of time. Even after such an update is delivered, certain harmful self-modified executables may not be disabled. These systems require continual updates by their vendors or system administrators, and are unable to block previously unknown harmful executables until after these executables have caused some harm (possibly in another organization).

Execution Pattern Systems

This type of system monitors the behavior of an executable and if the behavior correlates with that of previously known harmful executables, the executable is considered harmful. These systems may also require updates from their vendors and are unable to block all the harmful executables. They may also generate a significant number of false alarms and may still miss harmful executables while generating a large number of false positives.

Black-List Combined with Execution Pattern Systems

These systems still have the same problems as those above. Black-list and execution-pattern systems are greatly inferior to this system in terms of security. In principle, it might be possible to combine some of the competing products with either another one and/or custom software, but this results in a system that is very difficult to implement and support.

White-List Systems

These systems are very secure, but are not flexible, because the users may need to run unknown executables which are not harmful. With purely white list systems, this requires a prior authorization by a system administrator. There are a number of products that implement the white-list approach; however, they do not support at least one of the following: local authorization, spread monitoring and flexible rules. With the white list approach, any unknown executable is blocked, or the user, if trusted, is asked for a decision—the latter lets the user disallow an executable even when it is executed automatically, without the user's prior consent. Systems that follow a strictly white-list approach, while very secure, are inflexible.

White-List Combined with Black-List Systems Combined with Execution Pattern Systems In these systems, certain users or computers are exempt from white-list checking, and only black-list in combination with execution pattern checking applies. While this does reduce the risk significantly, the exempt users face the same risks as those in non-white-list systems. even the systems that follow a combined approach still exhibit these deficiencies.

Some systems have employed cryptographic digests and digital certificates at the time when an executable is introduced to the system—but they are unable to deal with the executables that are introduced in a way they cannot handle, or with the executables introduced when these systems were inactive. Other systems have used cryptographic digests and digital signatures at the time of execution, but not via intercepting system services, which makes it possible to circumvent their protection.

Yet still other systems implement a fixed priority rule scheme, or are not scoped, or do not support flexible rule targets.

BRIEF SUMMARY OF THE INVENTION

This system adds local authorization to the white-list combined with black-list approach; local authorization may only be enabled for a selected number of trusted users. The other users work in a very secure environment. The trusted users are always able to disallow an undesirable executable, even if it is started automatically by an insecure or compromised application. Since such locally authorized executables are the only potentially harmful executables, spread of harmful executables can be detected reliably and in a very straightforward way.

The automatic security escalation, i.e., switching to the white-list-only mode for all the users immediately, limits a detected spread before it may affect the organization significantly; this is not possible with black-list or execution-pattern systems, because there is no naturally defined secure environment.

SIGNIFICANT FEATURES OF THE PRESENT INVENTION INCLUDE

1. The usage of cryptographic digests and digital certificates at the time of execution, by way of intercepting the operating system's load and execute services.

2. Local authorization of unknown executables.

3. Hierarchical and scoped rules with intra-scope priorities and inter-scope priority overrides, with heterogeneous rule objects and highly granular targets.

4. Spread monitoring, where spread is defined as a growing number of users authorizing an executable locally. The present invention, which combines a white-list approach with local authorization, guarantees that the only harmful executables that may be executed at protected computers are those locally authorized. This, in turn, guarantees that all potentially harmful executables are detected and that the number of false positives is reduced dramatically.

5. Security escalation upon detecting a spread. As soon as a spread is detected, the system automatically transitions into a white-list-only mode, which immediately prevents all unknown executables from being executed.

An embodiment of the present invention is a method of controlling the execution of a executable file on a computer system. The method includes the steps of (i) intercepting a system service during an attempted execution of the executable file, (ii) examining an ordered set of authorization rules to determine whether it is permissible to execute the executable file, the ordered set of rules describing allowed targets, objects, and schedules, wherein allowed targets includes a list of allowed users or computer systems, allowed objects includes a list of permitted executables, each uniquely identifiable, and whether user authorization is permitted, and allowed schedules includes a list of conditions under which an execution is allowed, (iii) applying a stored permission to determine whether or not to execute the file, if there is a rule in the set with a matching target, object, and applicable schedule, (iv) determining whether or not there is a local authorization rule, a matching target and applicable schedule, if there is no rule with a matching target, object and applicable schedule, (v) applying a recorded decision to determine whether or not to execute the file, if there is a local authorization rule, a matching target and applicable schedule and there is a record of the current executable, (vi) obtaining input from the user to determine whether or not to execute the file, and storing the input in the local authorization rule for the executable, if there is no recorded decision, and (vii) invoking the intercepted service, if there is permission to execute the file.

Another embodiment of the present invention is a system for controlling the execution of an executable file. The system includes a database system, an administrative console, a user notification component, a server, and a protection module. The database system is arranged for storing and retrieving execution rules. The administrative console is configured for use by a system administrator to view and modify the execution rules. The user notification component is configured for receiving user authorization requests and sending user replies to the requests. The server is configured for retrieving rules stored in the database system, and is in operative communication with the administrative console to supply the rules to and receive rules from the administrative console. The protection module is in operative communication with the server over a secure channel to obtain stored execution rules and in operative communication with the user notification component to send user authorization requests and to receive user replies. The protection module is configured to intercept services provided by an operating system for executing executable files and to apply the execution rules to an intercepted executable file.

OBJECTS OF THE INVENTION

One object of the present invention is to control which executables may be loaded and executed in a centralized (organization-wide) way, with an option of delegating the decision to a trusted user locally.

Another object is to keep track of the execution attempts, successful and/or unsuccessful.

Yet another object is to monitor the spread of locally authorized executables throughout an organization.

Yet another object is to perform a corrective action automatically whenever a spread is detected.

Advantages over the prior systems include the use of a highly flexible set of execution rules, and the use of interception of system services.

The use of a highly flexible set of execution rules is not possible with black-list systems, and is implemented only to a limited degree in most white-list systems. This enables system administrators to implement user-productivity and licensing solutions (e.g., to authorize only a necessary minimum of executables for most users, and authorize certain executables only for the users that require them). Because user and computer groups are supported, system administrators can reuse the already established organizational structure.

The use of interception of system services is the most secure way of implementing execution rules, instead of intercepting executables above the level of system services (shell level, usermode abstraction layers).

BRIEF DESCRIPTION OF THE DRAWINGS

These and other features, aspects and advantages of the present invention will become better understood with regard to the following description, appended claims, and accompanying drawings where:

FIG. 1 is a system block diagram of the present invention;

FIG. 2 is a flow chart showing a process in accordance with an embodiment of the present invention.

DETAILED DESCRIPTION OF THE INVENTION

Figure 1A:
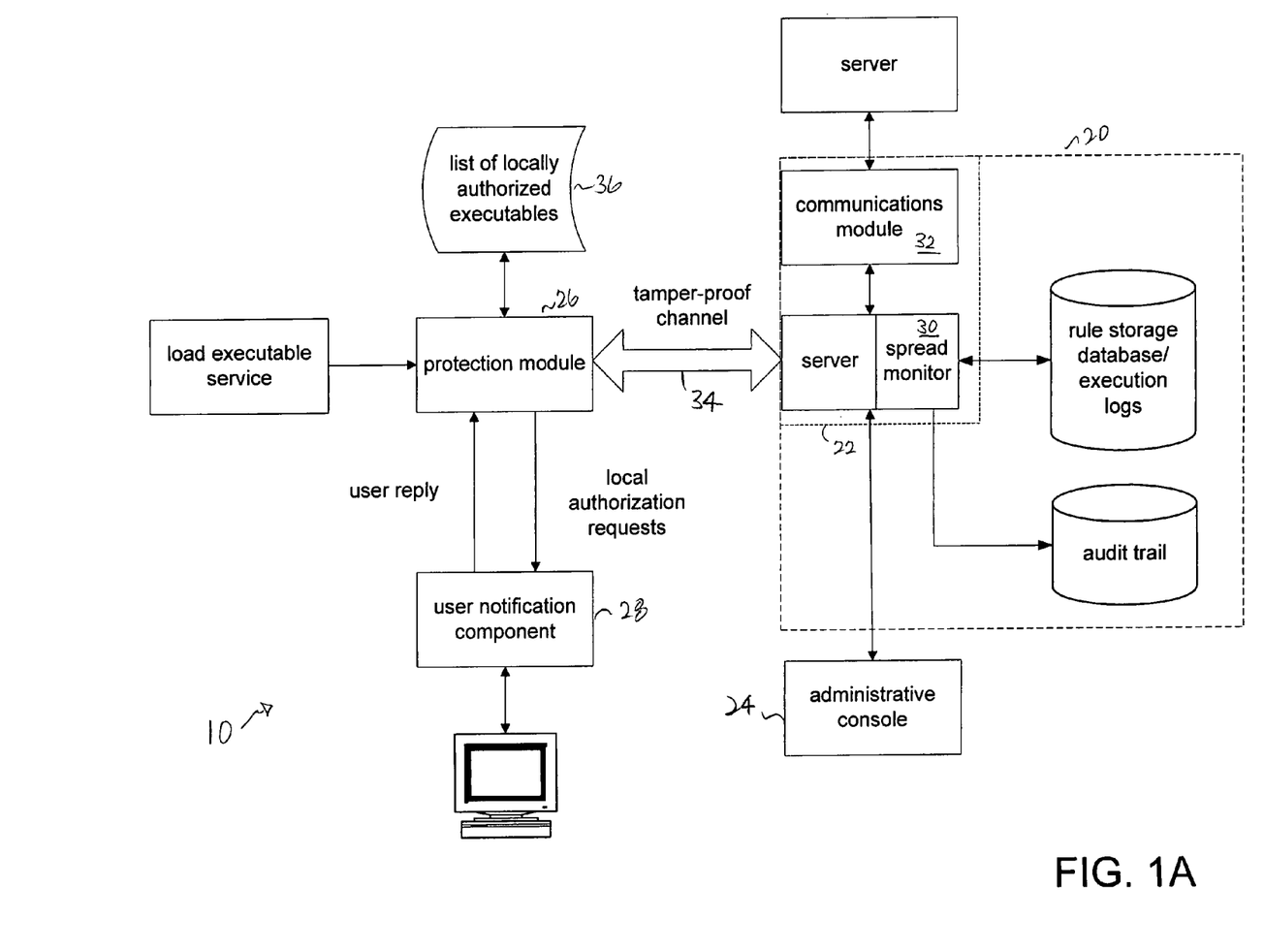
Figure 1B:
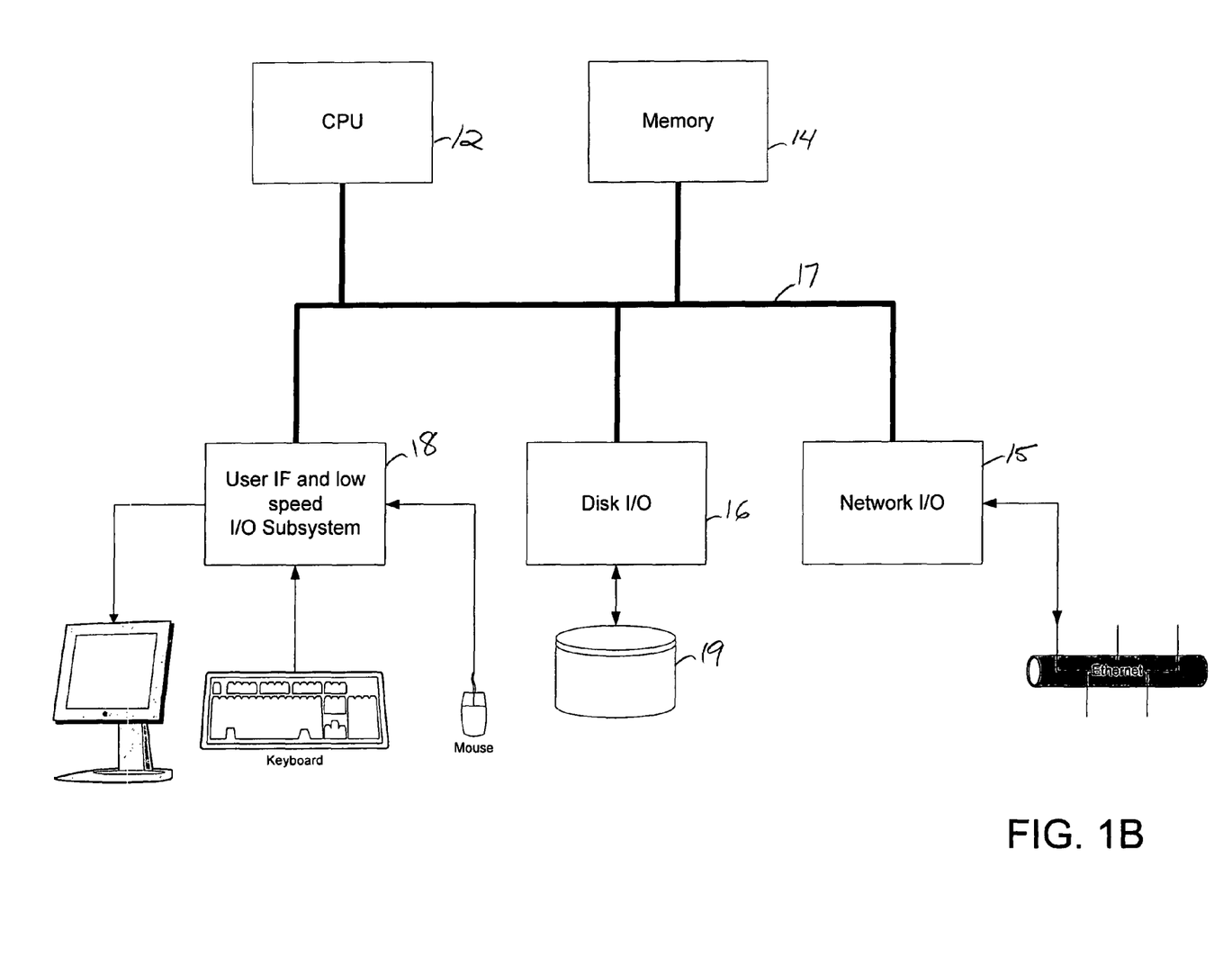

Referring to FIG. 1, the system 10 includes five standalone software components: a database system 20, a server 22, an administrative console 24, a protection module 26, and a user notification component 28. The software components execute on an exemplary computer system that includes a processor, a memory, a mass storage subsystem, and user-oriented I/O. The memory and/or mass storage system store the instructions of the software components used for execution by the processor.

The database system 20 stores all the execution rules in a centralized way. The database system may be supplied by a third party.

The server 22 retrieves the rules stored in the database system 20 and transforms them to a form that is secure and most convenient to the protected client. The server receives execution logs from the protected client and transforms them to form most suitable for the database storage. The server 22 supplies to and accepts execution rules from the administrative console 24 and hosts the spread monitor 30. The server 22 contains a module 32 for communicating with other servers, if an organization employs multiple servers (which is required when a significant number of protected clients are installed).

The administrative console 24 is a set of instruments that the system administrators uses to view and modify the execution rules, and view execution logs. The administrative console 24 communicates with the server 22 to perform these tasks.

The protection module 26 is a highly privileged module installed at the computers being protected. The module intercepts the services that the operating system provides to load and execute executable files. When a service is intercepted, the module 26 applies the execution rules. This module communicates with the server 22 over a secure (tamper-proof) channel 34 to receive the execution rules and to forward the execution logs. It also interacts with the user notification component 28 to perform local authorization and to notify the user of denied execution attempts. It stores the list 36 of locally authorized executables (because the list is maintained by a privileged component, it can be protected from tampering by normal executables).

The user notification component 28 is a normal application that executes in the context of a user. It receives local authorization requests from the protection module 26 and displays them to the user; when the user replies, it sends the reply to the protection module 26. It also receives and displays user notifications whenever an executable is denied.

To control loading and execution of executables in a centralized way, executables must be identifiable. The executables are identified by means of cryptographic digests (an industry standard cryptographic digest is computed from a full or partial binary image of an executable), their filesystem or network locations, digital certificates (digital certificates are issued by the vendors of the executables; any executable possessing a certificate by a particular vendor are associated with that vendor), etc; this list is not exhaustive.

The identification data are organized as a hierarchical set of rules. Each rule describes which computers and/or users it applies to; it may apply to computer and user groups, if supported by the operating system. This is known as the "rule targets". Each rule describes the executables it applies to, listing their digests, filesystem locations, digital certificates, etc. This is known as the "rule object". Special rule objects may specify that local authorization is to be performed, or that all executables be allowed (useful if certain targets are completely trusted). Each rule may specify additional conditions of rule applicability, such as date or time, number of allowed executions, etc. This is known as the "rule schedules". Each rule describes the organizational unit (e.g., a department, a site, an office, etc) it applies to, if organizational units are supported by the operating system. This is known as the "rule scope". If organizational units are not supported, the global scope is assumed.

The rules are ordered according to their scope and intra-scope priority (for rules with the same scope), and inter-scope overrides.

The rules are stored at a well-known location within an organization, where they are manipulated by designated administrators, and the changes are propagated to the participating computers.

Figure 2A:
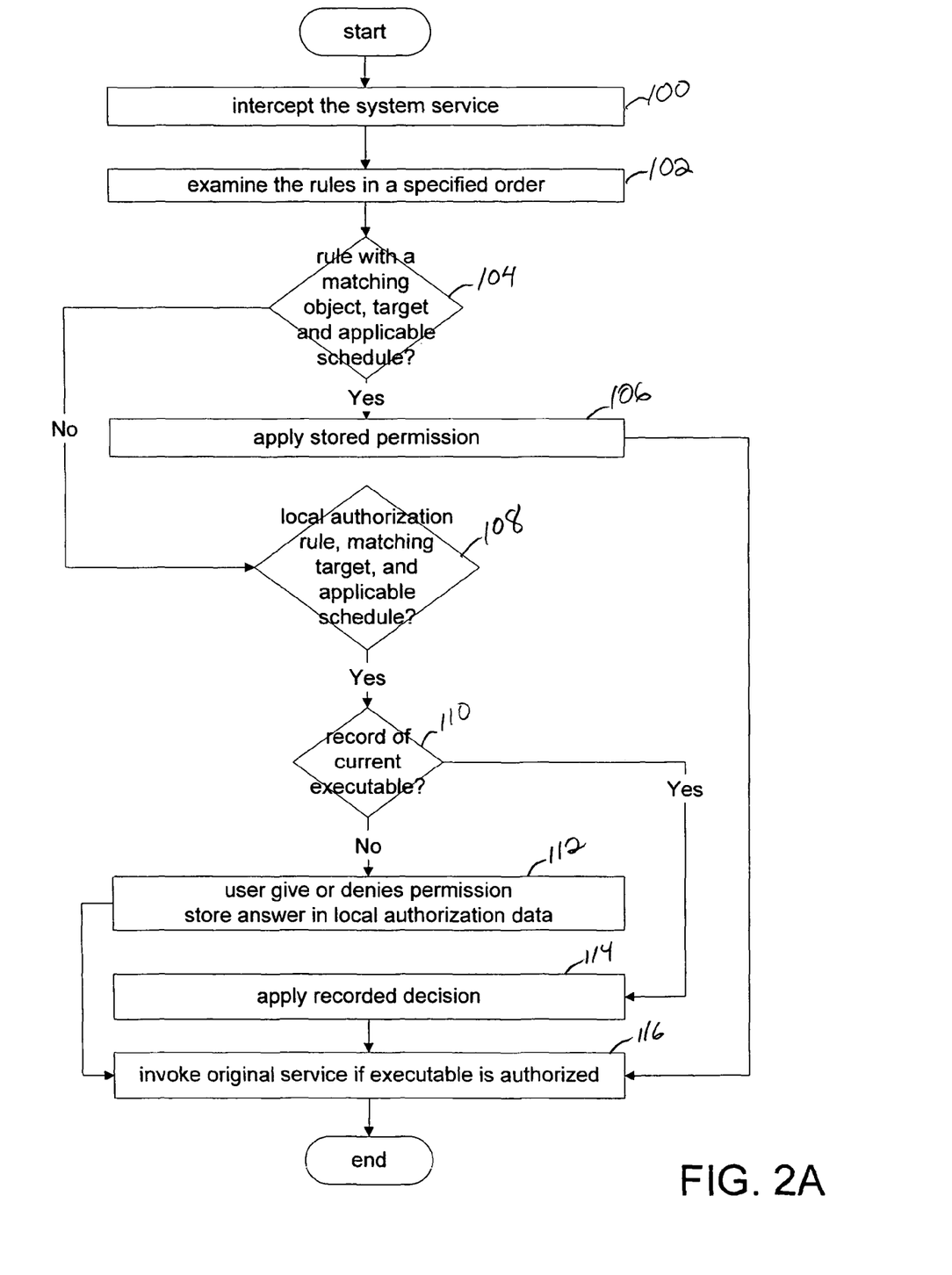
Figure 2B:
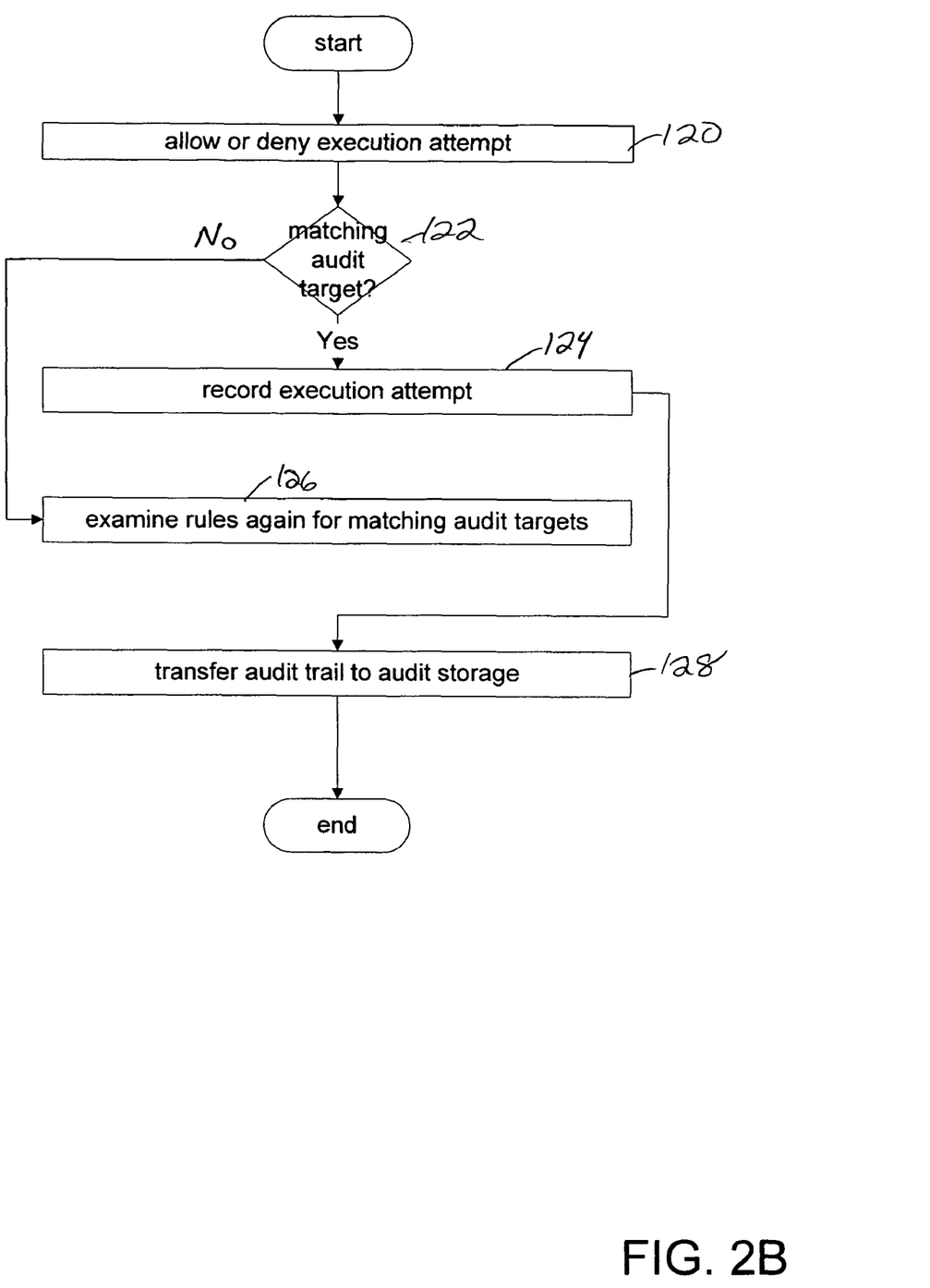

Referring to FIG. 2, the steps for controlling the execution of executables are as follows. When an execution attempt takes place, the relevant system services are intercepted, in step 100, by a privileged protection module, which examines the rules. The rules are examined in order, in step 102, as described above. If a rule with a matching object (different than local authorization), a matching target and an applicable schedule is found, as determined in step 104, the permission associated with the target allows or denies the executable, in step 106. If a local authorization rule with a matching target and an applicable schedule is found, as determined in step 108, then:

1. If the local authorization data do not contain a record on the current executable, as determined in step 110, the user is prompted with details on the executable. The user allows or denies the executable, in step 112, and, optionally, instructs the system to store his decision permanently in the local authorization data, in step 112.
2. If the local authorization data do contain a record on the current executable (identifiable by a cryptographic digest), the recorded decision is applied, in step 114.

If the executable is authorized during the rule search sequence, the original system service is invoked, in step 116.

If the executable is not authorized during the search sequence, or is explicitly denied during the search sequence, the original system service is not invoked, and an appropriate failure status is returned to the user.

Load and Execution Audit

Each rule may have special audit targets. When a rule allows or denies an execution attempt, and if the rule has a matching audit target, the execution attempt and the system decision are recorded in step 124. If a rule that has allowed or denied an execution attempt, in step 120, does not have a matching audit target, as determined in step 122, the rules are examined again (in the same order), in step 126, for matching audit targets. A rule may contain only audit targets; such a rule is ignored for execution control, but is considered for execution audit. The audit trails are transferred to a centralized audit storage in step 128, which provides means to retrieve the audit data based on a number of search criteria (where the execution attempt took place, on behalf of which user, involving which executable, when, etc).

To monitor the spread of locally authorized executables, an agent is provided that periodically accesses the centralized audit data storage and checks to determine whether any particular executable has been locally authorized by a number of distinct users that exceeds a threshold established by system administrators. If such a condition arises, an alert is generated.

When an alert is generated as described above, the system may automatically perform a corrective action if configured by system administrators. It may disable local authorization rules so as to prevent further spread of the executable throughout the organization. The system may also carry out a custom action, e.g., running a job that removes the offending executable from the clients.

Some operating systems have built-in capabilities for delivering a centralized and hierarchical set of data to computers within an organization. With these operating systems, the database system may only be required to keep the processed execution logs, and the server is required to process the execution logs and host the spread monitor. Likewise, the administrative console communicate directly with the system supplied facilities to view and manipulate the execution rules, and communicate with the server to query the execution logs. The protection module, in turn, receives the execution rules directly from the operating system.

In one implementation, for users or computers in the whitelist-only mode (taking into account the scope and priority of execution rules), any unauthorized executable is prevented from loading and executing. For users or computers in the local authorization mode, an attempt to load and execute an executable that is not authorized centrally or locally, the user is requested to allow or deny the executable. Centrally unauthorized executables that have been locally authorized are allowed to execute without user intervention. The spread monitor generates alerts whenever an executable is authorized locally by a number of users exceeding a threshold set by system administrators; if security escalation is configured for spread alerts, the protected computers are automatically requested to switch into the white-list-only mode.

Although the present invention has been described in considerable detail with reference to certain preferred versions thereof, other versions are possible. Therefore, the spirit and scope of the appended claims should not be limited to the description of the preferred versions contained herein.

What is claimed is:

1. A computer-implemented method, comprising:
   (A) receiving at a microprocessor instructions of a first executable program;
   (B) executing the instructions of the first executable program via the microprocessor, wherein the executing step comprises:
   (1) receiving an identifier of a second executable program;
   (2) determining from the identifier whether the second executable program is referenced by a pre-existing rule;
   (3) if the second executable program is not referenced by the pre-existing rule:
      (i) requesting a new provisional rule from a provisional rule-making authority;
      (ii) receiving the new provisional rule;
      (iii) determining whether the new provisional rule allows the second executable program to be executed by a computer;
      (iv) allowing execution of the second executable program if the new provisional rule allows the second executable program to be executed by the computer; and
      (v) disallowing execution of the second executable program if the new provisional rule disallows the second executable program to be executed by the computer.

2. The computer-implemented method of claim 1, comprising:
   using the identifier to determine whether the second executable program is referenced in a white-list;
      (i) wherein the white-list includes identifiers of executable programs that are pre-determined to be allowed to be executed by the computer; and
   allowing the computer to execute the second executable program, if the second executable program is referenced in the white-list.

3. The computer-implemented method of either claim 1 or 2 further comprising:
   determining whether a white-list-only operational mode has been selected;
   disallowing the computer to execute the second executable program if:
      (i) the white-list-only operational mode has been selected; and
      (ii) second executable program is not referenced in the white-list.

4. The computer-implemented method of either claim 1 or 2, wherein:
   (i) the computer is a first computer; and
   (ii) the microprocessor is located on the first computer.

5. The computer-implemented method of either claim 1 or 2, wherein:
   (i) the computer is a first computer; and
   (ii) the microprocessor is located on a second computer, different from the first computer.

6. The computer-implemented method of claim 3, wherein:
   (i) the computer is a first computer; and
   (ii) the microprocessor is located on the first computer.

7. The computer-implemented method of claim 3, wherein:
   (i) the computer is a first computer; and
   (ii) the microprocessor is located on a second computer, different from the first computer.

* * * * *

UNITED STATES PATENT AND TRADEMARK OFFICE
CERTIFICATE OF CORRECTION

PATENT NO.       : 8,060,924 B2
APPLICATION NO.  : 11/107900
DATED            : November 15, 2011
INVENTOR(S)      : Viacheslav Usov It is certified that error appears in the above-identified patent and that said Letters Patent is hereby corrected as shown below:

Column 8, line 21, after "(ii)" and before "second" insert --the--.

Signed and Sealed this
Tenth Day of April, 2012

David J. Kappos
*Director of the United States Patent and Trademark Office*